United States Patent
Lapeyre

(10) Patent No.: US 6,695,135 B1
(45) Date of Patent: Feb. 24, 2004

(54) FLEXIBLE FLIGHT MODULES IN MODULAR PLASTIC CONVEYOR BELTS

(75) Inventor: Robert Lapeyre, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 10/248,291

(22) Filed: Jan. 6, 2003

(51) Int. Cl.[7] .................................................. B65G 17/06
(52) U.S. Cl. ........................................ 198/853; 198/690.2
(58) Field of Search ........................... 198/850, 852, 198/853, 690.2, 699.1

(56) References Cited

U.S. PATENT DOCUMENTS

| | | | | |
|---|---|---|---|---|
| 4,832,183 A | * | 5/1989 | Lapeyre | 198/690.2 X |
| 4,925,013 A | | 5/1990 | Lapeyre | 198/698 |
| 5,000,311 A | | 3/1991 | Abbestam et al. | 198/803.01 |
| 5,323,893 A | | 6/1994 | Garbagnati | 198/690.2 |
| 5,377,819 A | | 1/1995 | Horton et al. | 198/853 |
| 5,507,383 A | | 4/1996 | Lapeyre et al. | 198/853 |
| 6,321,904 B1 | * | 11/2001 | Mitchell | 198/690.2 X |
| 6,382,404 B1 | * | 5/2002 | Guldenfels | 198/853 X |
| 6,467,610 B1 | * | 10/2002 | MacLachlan | 198/853 X |
| 6,554,129 B2 | * | 4/2003 | Straight et al. | 198/853 X |

OTHER PUBLICATIONS

RAM BELTS & CHAINS Catalog, p. 17 and front and back covers, Copyright 2001, Ram Belts and Chains, Inc., Reading, PA.

* cited by examiner

Primary Examiner—James R. Bidwell
(74) Attorney, Agent, or Firm—James T. Cronvich

(57) ABSTRACT

Modular plastic conveyor belt modules with flexible flights. The belt modules are molded out of a hard thermoplastic material. Upstanding structure made out of a resilient rubber-like material is bonded to a base portion of the belt module to form a flexible flight that can yield to obstructions and blows that might otherwise damage flights made of less resilient materials.

37 Claims, 5 Drawing Sheets

FLEXIBLE FLIGHT MODULES IN MODULAR PLASTIC CONVEYOR BELTS

BACKGROUND OF INVENTION

This invention relates to power-driven modular plastic conveyor belts and, more particularly, to plastic belt modules having upstanding structures, such as flights, made of resilient materials.

Modular plastic conveyor belts, constructed of rows of belt modules hingedly linked together at hinge joints between adjacent rows, are widely used to convey articles. Many applications require a conveyor belt to transport articles on an inclined path. To prevent articles from sliding down the conveying surface as the belt traverses an incline or a decline, flights are often used. Typically, flights are in the form of plates extending perpendicularly from the conveying surface of a belt. The flights form walls past which conveyed articles cannot slide. Although flights are often detachable from a belt module, usually flights form an integral part of a belt module, molded as a single part. Because plastic belt modules are typically molded out of a thick, hard plastic material, such as polyethylene, polypropylene, and acetal, they are somewhat inflexible. Conventional integrally molded inflexible flights are susceptible to damage because they extend upward from the conveying surface. The flights can bump into obstructions or be damaged by contact with conveyed articles. The top edge of a flight is especially vulnerable to scoring and chipping.

Thus, there is a need for a flight that is not so susceptible to damage.

SUMMARY OF INVENTION

This need and others are satisfied by a conveyor belt module embodying features of the invention. The module comprises a module body made of a hard plastic material. The module body extends in length from a first end to a second end. The module body includes first and second sets of hinge eyes formed along the opposite first and second ends. A base portion lies between the first and second ends. Upstanding structure made of a resilient material having a bottom and thermally bonded to the base portion of the module body extends to a height above the base portion greater than the length of its bottom.

Another version of belt module comprises a module body made of a hard plastic material. The module body has hinge eyes along opposite ends of the body and an intermediate base portion between the opposite ends. An integral frame standing up from the base portion is at least partly encapsulated by a resilient material.

In yet another version, a conveyor belt module comprises a module body made of a hard plastic material. Hinge eyes along opposite ends of the module body flank an intermediate base portion. Upstanding structure made of a resilient material is thermally bonded to a textured surface formed on the base portion of the module body.

In a further version, a conveyor belt module includes a module body made of a hard plastic material. The module body includes first and second sets of hinge eyes formed along opposite first and second ends of the module body. An intermediate base portion is between the first and second ends. An integrally formed frame extends upward from the base portion. A resilient member is thermally bonded to the base portion and the frame.

A method for forming a flighted conveyor belt module according to an aspect of the invention comprises: molding a module body having a base portion out of a hard plastic material; and thermally bonding a flight made out of a resilient material to the base portion of the module body.

Thus, the invention provides, among other benefits, a flexible upstanding structure able to yield to obstructions and impacts so as to avoid damage.

BRIEF DESCRIPTION OF DRAWINGS

These and other features, aspects, and advantages of the invention are described in more detail in the following description, appended claims, and accompanying drawings, in which:

DETAILED DESCRIPTION

Figure 1:
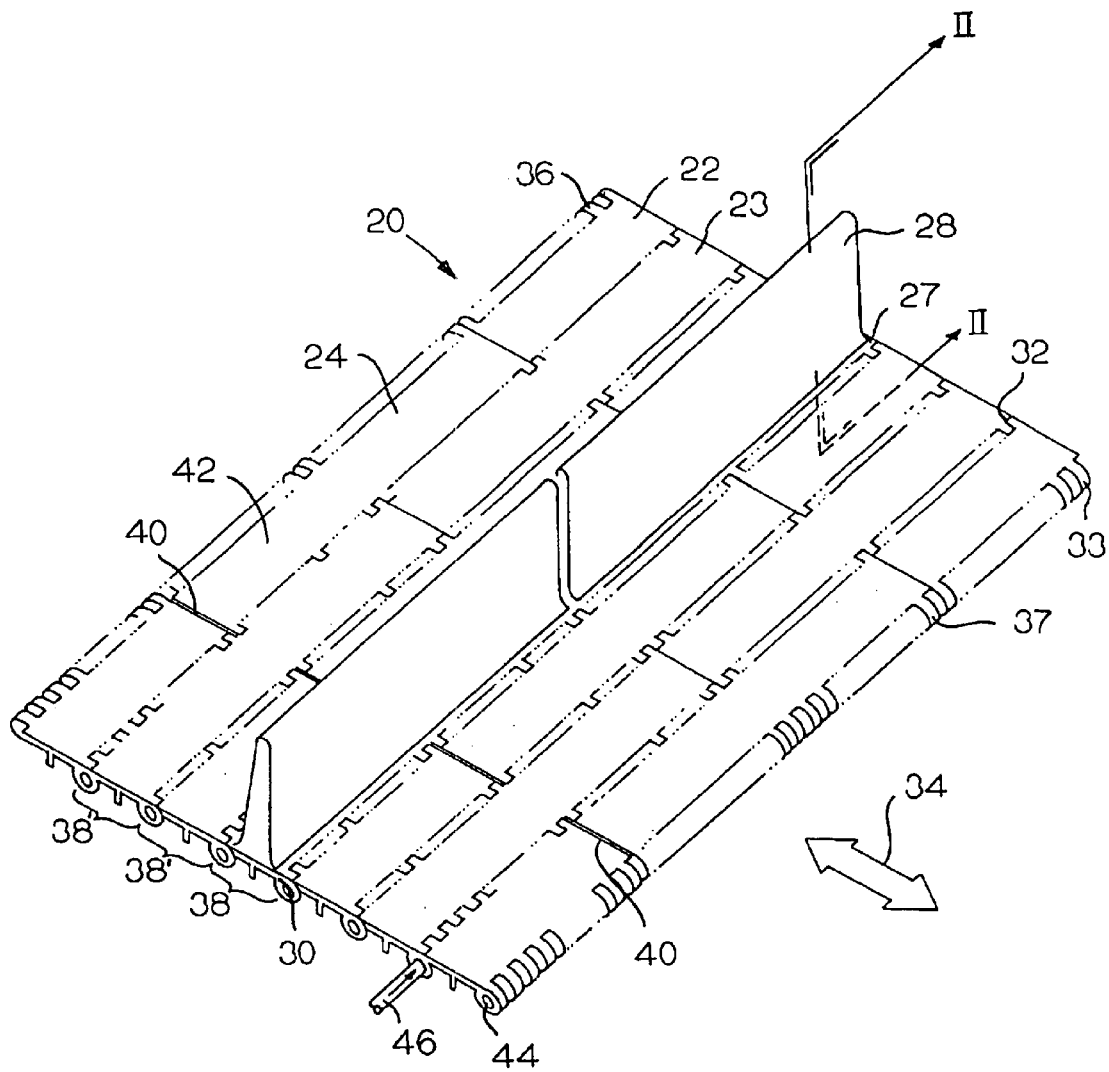
FIG. 1 is an isometric view of a portion of a flighted conveyor belt embodying features of the invention.

A portion of a modular conveyor belt embodying features of the invention is shown in FIG. 1.

The belt 20 is constructed of a plurality of belt modules, including standard modules (short edge 22, long edge 23, and interior 24) and flighted modules 27, which may be short edge, long edge, or interior modules. The flighted modules feature upstanding structure in the form of a flight 28 extending from the module body 30. The plastic module bodies are preferably injection molded of a thermoplastic material such as polypropylene, polyethylene, nylon, acetal, or composites of those and other polymers or fillers. The modules extend in length from a first end 32 to a second end 33 in the direction of belt travel 34. A first set of hinge eyes 36 is arranged along the first end of each module; a second set of hinge eyes 37 is arranged along the opposite second end. Each belt row 38, 38', is made up of one or more side-by-side belt modules with seams 40 between adjacent modules. The flat upper surfaces of the modules form an article-conveying surface 42 of the belt. The belt rows are arranged end to end with the first set of hinge eyes of a row interleaved with the second set of hinge eyes of an adjacent row. Aligned openings 44 in interleaved hinge eyes form a lateral passageway across the width of the belt. A hinge pin 46 resides in the passageway to connect consecutive rows together in a hinge that allows the belt to backflex and to articulate about conventional idler and motor-driven drive sprockets or drums (not shown).

The belt of FIG. 1 is shown with flighted rows 38 and unflighted rows 38'. This represents just one example of a belt that can be made of these modules. More interior modules can be added to each row to widen the belt. The number of unflighted rows between flighted rows could be increased or decreased to make for larger or smaller compartments between consecutive flights.

Figure 2:
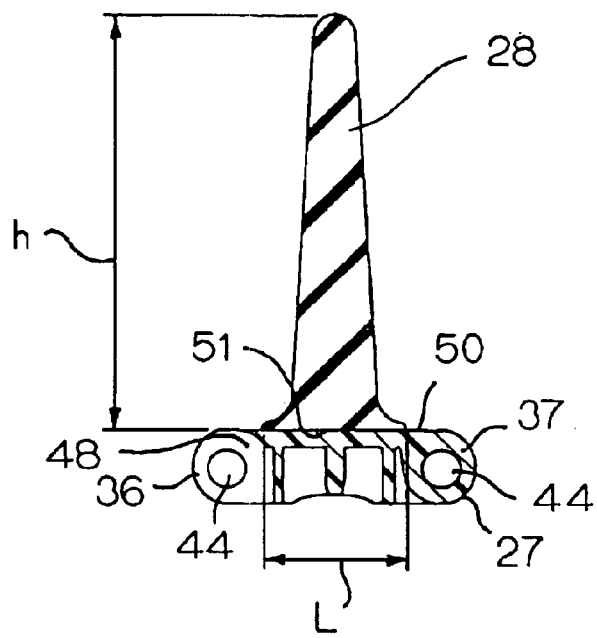
FIG. 2 is a cross section of a module of a conveyor belt as in FIG. 1 taken along lines II—II.

A cross section of a flighted module 27 as in FIG. 1 is shown in FIG. 2. The module body includes a base portion 48 between opposite sets of hinge eyes 36, 37. The base portion includes a flat upper surface 50 to which the bottom 51 of upstanding structure in the form of a flexible flight 28 is molded. The flight is molded out of a resilient material, such as rubber or rubber-like materials (e.g., neoprene or SANTOPRENE thermoplastic elastomer). The resilient flight is preferably co-molded to the hard base portion in a process such as that described in U.S. Pat. No. 5,507,383, High Friction Plastic Conveyor Belts Having Modular Links Formed By Two Integrated Plastic Materials. The disclosure of that patent is incorporated by reference. The thermal bond formed between the hard plastic base and the bottom of the resilient flight makes a stable junction. The bond could alternatively be formed in an overmolding process. The height h of the flight in FIG. 1 is at least as great as the length L of its bottom.

Figure 3:
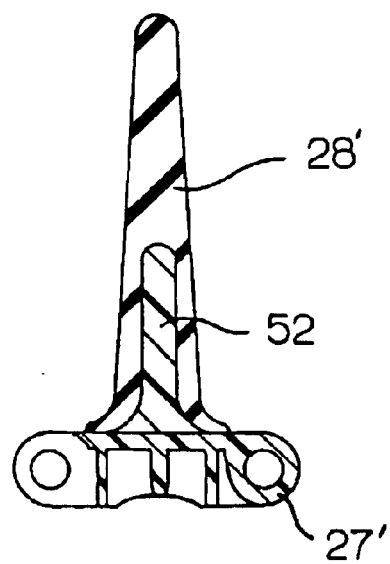
FIG. 3 is a cross section of another version of conveyor belt module usable in a conveyor belt as in FIG. 1, in which a resilient flight encapsulates a frame.

Another version of flighted module is shown in cross section in FIG. 3. The module 27'includes an integral frame in the form of a wall 52 extending upward from the intermediate base portion of the module body. The wall is preferably unitarily formed with the module body out of the same hard plastic material. A resilient flight 28' encapsulates the wall, which serves to form a strong support for the flight and a larger bonding area between the two materials.

Figure 4:
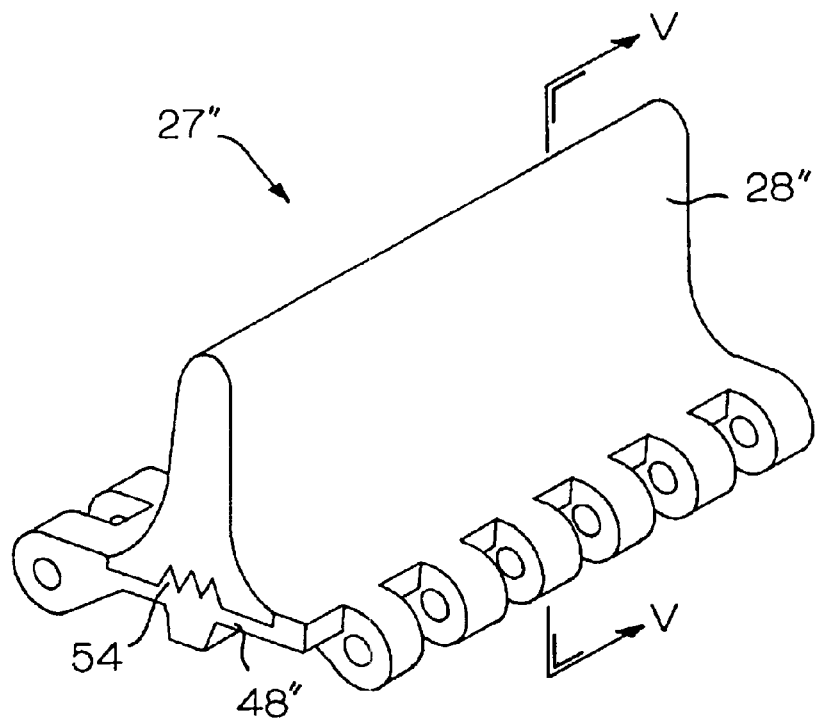
FIG. 4 is an isometric view of another version of belt module usable in a conveyor belt as in FIG. 1, in which a resilient flight is molded to a textured surface on the module.
Figure 5:
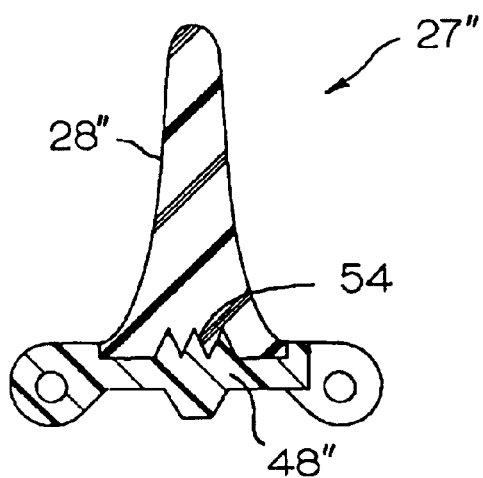
FIG. 5 is a cross section the module of FIG. 4 taken along lines V—V.

Yet another version of module is shown in FIGS. 4 and 5. The base portion of the module 27" has a top textured surface area 54, indicated as three parallel ridges 56 extending laterally across the width of the module The textured surface increases the surface area of the thermal bond between an upstanding flight 28", made of a resilient material, and the base portion, made of a hard plastic material.

Figure 6:
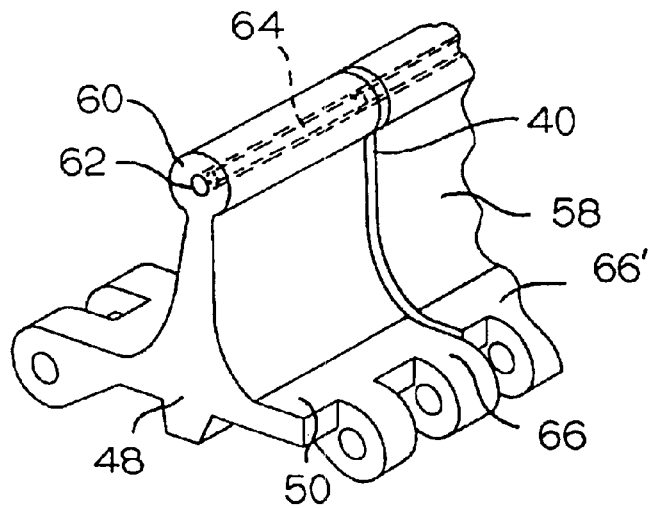
FIG. 6 is an isometric view of a portion of another version of module usable in a conveyor belt as in FIG. 1, in which a resilient flight has a bore for a reinforcing rod at the top edge.
Figure 7:
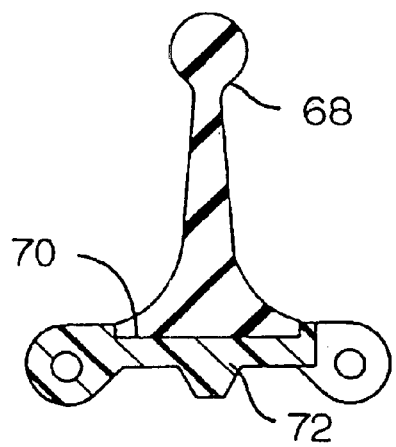
FIG. 7 is a cross section of another version of a module usable in a conveyor belt as in FIG. 1, in which a resilient flight has an enlarged top edge.
Figure 8:
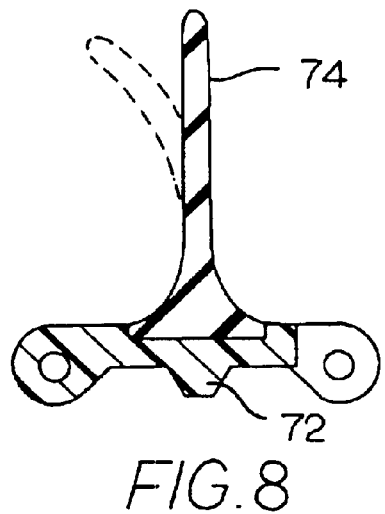
FIG. 8 is a cross section of another version of module usable in a conveyor belt as in FIG. 1, in which a thin flexible flight is molded with the module and in which the flight is shown in phantom in a flexed condition.

Another version of flighted module is shown in FIG. 6. The base portion 48 of the module is shown to be similar to that of FIG. 2, but it could be made as the base portions of FIGS. 3 or 4. An upstanding flight 58, made of a resilient material, is thermally bonded to the top surface 50 of the base portion. The top edge of the flight forms an enlarged head 60 with a lateral bore 62. A connecting pin 64 received in the aligned bores of side-by-side modules 66, 66' helps keep the flight aligned across inter-module seams 40 across the width of a belt. A version as in FIG. 6, but with an upstanding flight 68 without a bore bonded to a recessed area 70 formed in a base portion 72 of the module body, is shown in FIG. 7. A thin flight 74 shown bonded to a base portion 72 in FIG. 8. The thin flight can flex as shown when it encounters obstructions or structures as it travels along a conveyor carryway or returnway.

Figure 9:
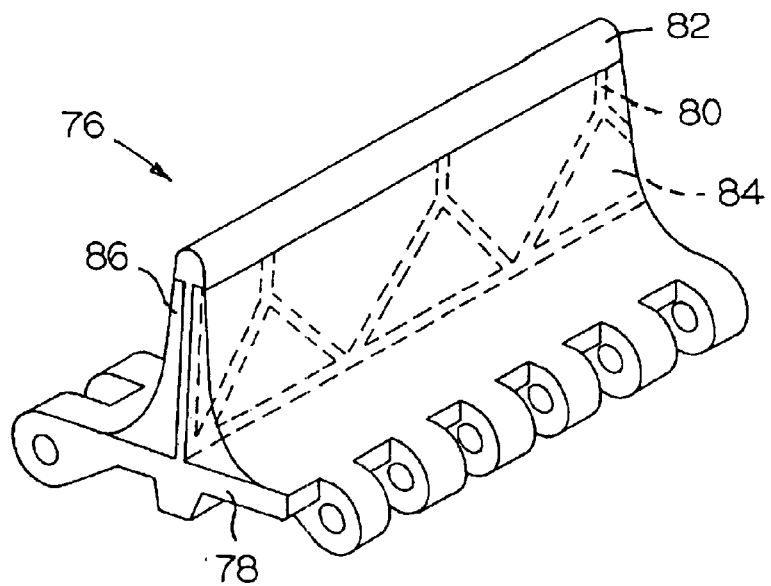
FIG. 9 is an isometric view of a portion of a module usable in a conveyor belt as in FIG. 1, in which a resilient material is molded around a skeletal frame.
Figure 10:
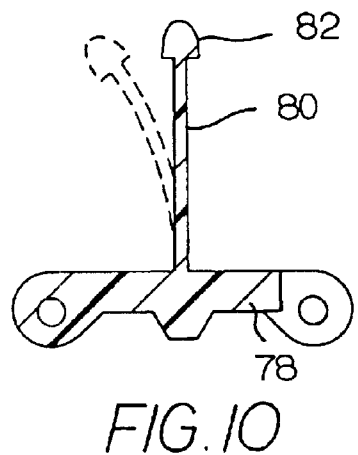
FIG. 10 is a cross section of the module of FIG. 9 with the resilient material not shown and the frame is shown in a flexed position in phantom.

Another version of module is shown in FIGS. 9 and 10. The module 76 includes a base portion 78 made of a hard plastic material. Unitarily formed with the base portion and extending upward from it is a thin frame 80. The integral frame is preferably molded of the same material as the module body. The top edge of the frame is in the form of an enlarged head 82. Although the frame could be in the form of a continuous sheet, it is shown in FIG. 9 with voids 84 to make it more flexible so that it can bend as shown in FIG. 10, unlike the stiff wall 52 in FIG. 3. The frame 80, except for the head 82, is encapsulated by a resilient material 86 forming an upstanding The flight material is firmly bonded to the base portion and the frame. The head, molded of a harder material, provides resistance to chips and cuts from hard or sharp objects.

Figure 11:
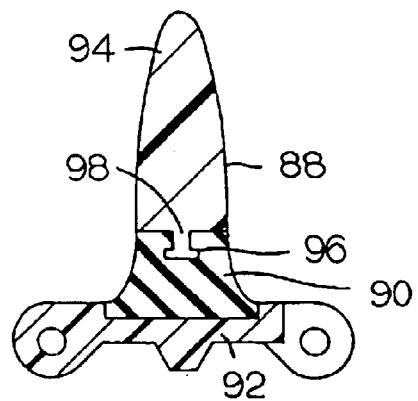
FIG. 11 is a cross section of another version of module usable in a conveyor belt as in FIG. 1, in which a flight is formed of a resilient portion topped by a stiff edge portion.

Still another version of flight module is shown in FIG. 11. The flight 88 includes two portions: a lower resilient portion 90 bonded to a base portion 92 of the module; and an upper portion 94 made of a durable material such as, for example, the base material. The upper portion is bonded to the lower portion. A slot 96 formed in the lower portion receives a complementary tab 98 formed on the top portion to make a more robust joint. The resilient lower portion provides the durable upper portion of the flight with a flexible base that allows the flight to give somewhat as it encounters obstructions or blows.

Although the invention has been described with respect to a few example versions, other versions are possible. For example, upstanding structures having shapes different from those described could be formed. The bonding, though preferably described as thermal bonding, could be achieved by adhesives, ultrasonic or electromagnetic welding, or other techniques used to bond plastics to rubber-like materials. As these examples suggest, the claims are not meant to be limited to the specific versions described.

What is claimed is:

1. A conveyor belt module comprising:
    a module body made of a hard plastic material extending in length from a first end to an opposite second end and including a first set of hinge eyes along the first end and a second set of hinge eyes along the second end and a base portion between the first and second ends of the module body;
    upstanding structure made of a resilient material and having a bottom thermally bonded to the base portion of the module body, the upstanding structure extending to a height above the base portion greater than the length of the bottom of the upstanding structure.

2. A conveyor belt module as in claim 1 firer comprising a fiance integrally formed with the module body and extending upward from the base portion and wherein the upstanding structure covers the frame.

3. A conveyor belt module as in claim 2 wherein the fame is thin and able to flex.

4. A conveyor belt module as in claim 2 wherein the frame forms voids therethrough.

5. A conveyor belt module as in claim 1 further comprising a top edge made of a hard plastic material thermally bonded to the upstanding structure along the height of the upstanding structure.

6. A conveyor belt module as in claim 1 wherein the base portion of the module is textured to increase the surface area of the thermal bond between the upstaging structure and the base portion.

7. A conveyor belt as in claim 6 wherein the base portion of the module body is textured in the form of parallel lateral ridges along the base portion.

8. A conveyor belt as in claim 1 wherein the hard plastic material is selected from the group consisting of polypropylene, polyethylene, acetal, and fiber-filled composite polymers.

9. A conveyor belt as in claim 1 wherein the resilient material is selected from the group consisting of rubber, neoprene, and SANTOPRENE thermoplastic elastomer.

10. A conveyor belt module as in claim 1 wherein the upstanding structure forms a flight.

11. A conveyor belt module as in claim 1 wherein the upstanding structure forms a bore therethrough.

12. A modular conveyor belt comprising:
a plurality of first belt modules as in claim 1;
a plurality of second structurally similar belt modules interconnectable with the first belt modules, but lacking the upstanding structure; and
a plurality of hinge pins;
wherein the first belt modules and the second belt modules are interconnected end to end into a series of rows of belt modules with the hinge eyes of adjacent rows interleaved and connected by the hinge pins.

13. A conveyor belt module comprising:
a module body made of a hard plastic material and having hinge eyes along opposite ends of the module body and an intermediate base portion between the opposite ends of the module body;
an integral frame upstanding from the base portion of the module body;
a resilient material thermally bonded directly to and encapsulating at least a portion of the frame.

14. A conveyor belt module as in claim 13 wherein the integral frame is made of the same material as the module body.

15. A conveyor belt module as in claim 13 wherein the frame is thin and able to flex.

16. A conveyor belt module as in claim 13 wherein the frame forms voids therethrough.

17. A conveyor belt as in claim 13 wherein the hard plastic material is selected from the group consisting of polypropylene, polyethylene, acetal, and fiber-filled composite polymers.

18. A conveyor belt as in claim 13 wherein the resilient material is selected from the group consisting of rubber, neoprene, and SANTOPRENE thermoplastic elastomer.

19. A conveyor belt module as in claim 13 wherein the resilient material encapsulating the frame forms a flight.

20. A conveyor belt module as in claim 13 wherein the frame further includes a top edge not encapsulated by the resilient material.

21. A modular conveyor belt comprising:
a plurality of first belt modules as in claim 13;
a plurality of second structurally similar belt modules interconnectable with the first belt modules, but lacking the integral frame and encapsulating material; and
a plurality of hinge pins;
wherein the first belt modules and the second belt modules are interconnected end to end into a series of rows of belt modules with the hinge eyes of adjacent rows interleaved and connected by the hinge pins.

22. A conveyor belt module comprising:
a module body made of a hard plastic material and having hinge eyes along opposite ends of the module body and an intermediate base portion between the opposite ends of the module body, wherein the base portion includes a textured surface;
upstanding structure made of a resilient material thermally bonded to the textured surface of the base portion of the module body.

23. A conveyor belt module as in claim 22 further comprising a frame integrally formed with the module body and extending upward from the base portion and wherein the upstanding structure covers the frame.

24. A conveyor belt module as in claim 23 wherein the frame is thin and able to flex.

25. A conveyor belt module as in claim 23 wherein the frame forms voids therethrough.

26. A conveyor belt module as in claim 22 further comprising a top edge made of a hard plastic material thermally bonded to the upstanding structure along the height of the upstanding structure.

27. A conveyor belt as in claim 22 wherein the base portion of the module body is textured in the form of parallel lateral ridges extending across the base portion between the first and second ends.

28. A conveyor belt as in claim 22 wherein the hard plastic material is selected from the group consisting of polypropylene, polyethylene, acetal, and fiber-filled composite polymers.

29. A conveyor belt as in claim 22 wherein the resilient material is selected from the group consisting of rubber, neoprene, and SANTOPRENE thermoplastic elastomer.

30. A conveyor belt module as in claim 22 wherein the upstanding structure forms a flight.

31. A modular conveyor belt comprising:
a plurality of first belt modules as in claim 22;
a plurality of second structurally similar belt modules interconnectable with the first belt modules, but lacking the upstanding structure; and
a plurality of hinge pins;
wherein the first belt modules and the second belt modules are intercounected end to end into a series of rows of belt modules with the hinge eyes of adjacent rows interleaved and connected by the hinge pins.

32. A conveyor belt module comprising:
a module body made of a hard plastic material, the module body including:
first and second sets of hinge yes formed along opposite first and second ends of the module body;
an intermediate base portion between the first and second ends of the module body; and
an integrally formed frame extending upward from the base portion; and
a resilient member thermally bonded to the intermediate base portion and to the frame.

33. A conveyor belt module as in claim 32 wherein the frame forms a skeletal structure encapsulated by the resilient member.

34. A conveyor belt module as in claim 32 wherein the frame is thin and flexible.

35. A method for forming a flighted conveyor belt module comprising:

molding a module body extending in length from a first end to an opposite second end and including a first set of hinge eyes along the first end and a second set of binge eyes along the second end and a base portion between the first and second ends of the module body out of a hard plastic material;

thermally bonding a flight made out of a resilient material and having a bottom to the base portion of the module body, the flight extending to a height above the base portion greater than the length of the bottom of the flight thermally bonded to the base portion.

36. The method of claim 35 further comprising:

integrally molding a frame out of the hard plastic material to the base portion of the module body when the module body is being molded; and covering the frame with the resilient material forming the flight.

37. The method of claim 35 further comprising:

forming a bore through a top portion of the flight.

* * * * *

(12) EX PARTE REEXAMINATION CERTIFICATE (6580th)
United States Patent
Lapeyre

(10) Number: US 6,695,135 C1
(45) Certificate Issued: Dec. 23, 2008

(54) FLEXIBLE FLIGHT MODULES IN MODULAR PLASTIC CONVEYOR BELTS

(75) Inventor: Robert Lapeyre, New Orleans, LA (US)

(73) Assignee: Laitram, L.L.C., Harahan, LA (US)

Reexamination Request:
No. 90/008,316, Feb. 2, 2007

Reexamination Certificate for:
Patent No.: 6,695,135
Issued: Feb. 24, 2004
Appl. No.: 10/248,291
Filed: Jan. 6, 2003

(51) Int. Cl.
*B65G 17/06* (2006.01)
*B65G 17/38* (2006.01)

(52) U.S. Cl. ............................... 198/853; 198/690.2
(58) Field of Classification Search .................. None
See application file for complete search history.

(56) References Cited

U.S. PATENT DOCUMENTS

| | | | |
|---|---|---|---|
| 2,909,271 A | 10/1959 | Taylor | |
| 3,857,478 A | 12/1974 | Meeusen | |
| 4,832,183 A | 5/1989 | Lapeyre | |
| 5,323,893 A | 6/1994 | Garbagnati | |
| 5,413,211 A | 5/1995 | Faulkner | |
| 5,507,383 A | 4/1996 | Lapeyre et al. | |
| 6,224,364 B1 * | 5/2001 | Harvey | 425/130 |
| 2001/0052451 A1 | 12/2001 | Ruoss et al. | |

FOREIGN PATENT DOCUMENTS

GB 1571981 7/1980

OTHER PUBLICATIONS

Excerpts from a brochure entitled "SKF Flex Link" published by Flexlink AB located at SE–415 50, Göteborg Sweden (7 pp.); copyright 1986.
Excerpts from a brochure published by Intralox, Inc., a subsidiary of the Laitram Corporation (6 pp.); copyright 2001.
Excerpts from a brochure entitled "Flat Top Chain Series" published by Rainbow Industrial Products Corp., (6 pp.); undated but admittedly prior art.

* cited by examiner

*Primary Examiner*—Aaron J. Lewis

(57) ABSTRACT

Modular plastic conveyor belt modules with flexible flights. The belt modules are molded out of a hard thermoplastic material. Upstanding structure made out of a resilient rubber-like material is bonded to a base portion of the belt module to form a flexible flight that can yield to obstructions and blows that might otherwise damage flights made of less resilient materials.

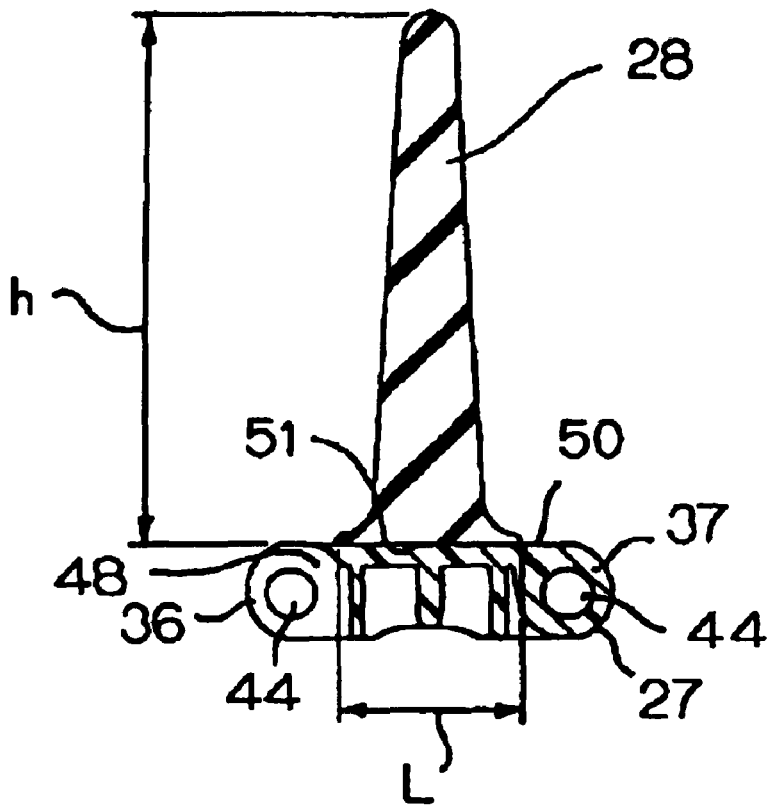

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 13–21 is confirmed.

Claims 2, 23, 31 and 36 are cancelled.

Claims 1, 3, 4, 6, 22, 24, 25, 32 and 35 are determined to be patentable as amended.

Claims 5, 7–12, 26–30, 33, 34 and 37, dependent on an amended claim, are determined to be patentable.

New claims 38–54 are added and determined to be patentable.

1. A conveyor belt module comprising:
a module body made of a hard plastic material extending in length from a first end to an opposite second end and including a first set of hinge eyes along the first end and a second set of hinge eyes along the second end and a base portion between the first and second ends of the module body;
upstanding structure made of a resilient material and having a bottom thermally bonded to the base portion of the module body, the upstanding structure extending to a height above the base portion greater than the length of the bottom of the upstanding structure; *and a frame integrally formed with the module body and extending upward from the base portion and wherein the upstanding structure covers the frame.*

3. A conveyor belt module as in claim [2] *1* wherein the [fame] *frame* is thin and able to flex.

4. A conveyor belt module as in claim [2] *1* wherein the frame forms voids therethrough.

6. A conveyor belt module as in claim 1 wherein the base portion of the module is textured to increase the surface area of the thermal bond between the [upstaging] *upstanding* structure and the base portion.

22. A conveyor belt module comprising:
a module body made of a hard plastic material and having hinge eyes along opposite ends of the module body and an intermediate base portion between the opposite ends of the module body, wherein the base portion includes a textured surface;
upstanding structure made of a resilient material thermally bonded to the textured surface of the base portion of the module body; *and a frame integrally formed with the module body and extending upward from the base portion and wherein the upstanding structure covers the frame.*

24. A conveyor belt module as in claim [23] *22* wherein the frame is thin and able to flex.

25. A conveyor belt module as in claim [23] *22* wherein the frame forms voids therethrough.

32. A conveyor belt module comprising:
a module body made of a hard plastic material, the module body including:
first and second sets of hinge [yes] *eyes* formed along opposite first and second ends of the module body;
an intermediate base portion between the first and second ends of the module body; [and]
an integrally formed frame extending upward from the base portion; and
a resilient member thermally bonded to the intermediate base portion and to the frame.

35. A method for forming a flighted conveyor belt module comprising:
molding a module body extending in length from a first end to an opposite second end and including a first set of hinge eyes along the first end and a second set of [binge] *hinge* eyes along the second end and a base portion between the first and second ends of the module body out of a hard plastic material;
thermally bonding a flight made out of a resilient material and having a bottom to the base portion of the module body, the flight extending to a height above the base portion greater than the length of the bottom of the flight thermally bonded to the base portion; *integrally molding a frame out of the hard plastic material, so as to extend from the base portion of the module body when the module body is being molded; and covering the frame with the resilient material forming the flight.*

*38. A conveyor belt module comprising:*
*a module body made of a hard plastic material extending in length from a first end to an opposite second end and including a first set of hinge eyes along the first end and a second set of hinge eyes along the second end and a base portion between the first and the second ends of the module body;*
*upstanding structure made of a resilient material and having a bottom thermally bonded to the base portion of the module body, the upstanding structure extending to a height above the base portion greater than the length of the bottom of the upstanding structure: and*
*a top edge made of a hard plastic material thermally bonded to the upstanding structure along the height of the upstanding structure.*

*39. A conveyor belt as in claim 38 wherein the base portion of the module body is textured in the form of parallel lateral ridges along the base portion.*

*40. A conveyor belt as in claim 38 wherein the hard plastic material is selected from the group consisting of polypropylene, polyethylene, acetal, and fiber-filled composite polymers.*

*41. A conveyor belt as in claim 38 wherein the resilient material is selected from the group consisting of rubber, neoprene, and SANTOPRENE thermoplastic elastomer.*

*42. A conveyor belt module as in claim 38 wherein the upstanding structure forms a flight.*

*43. A conveyor belt module as in claim 38 wherein the upstanding structure forms a bore therethrough.*

*44. A modular conveyor belt comprising:*
*a plurality of first belt modules as in claim 38;*
*a plurality of second structurally similar belt modules interconnectable with the first belt modules, but lacking the upstanding structure; and a plurality of hinge pins;*
*wherein the first belt modules and the second belt modules are interconnected end to end into a series of rows of belt modules with the hinge eyes of adjacent rows interleaved and connected by the hinge pins.*

45. A conveyor belt module comprising:

a module body made of a hard plastic material and having hinge eyes along opposite ends of the module body and an intermediate base portion between the opposite ends of the module body, wherein the base portion includes a textured surface; upstanding structure made of a resilient material thermally bonded to the textured surface of the base portion of the module body; and a top edge made of a hard plastic material thermally bonded to the upstanding structure along the height of the upstanding structure.

46. A conveyor belt as in claim 45 wherein the hard plastic material is selected from the group consisting of polypropylene, polyethylene, acetal, and fiber-filled composite polymers.

47. A conveyor belt as in claim 45 wherein the resilient material is selected from the group consisting of rubber, neoprene, and SANTOPRENE thermoplastic elastomer.

48. A conveyor belt as in claim 45 wherein the upstanding structure forms a flight.

49. A modular conveyor belt comprising:

a plurality of first conveyor belt modules as in claim 45;

a plurality of second structurally similar conveyor belt modules interconnectable with the first conveyor belt modules, but lacking the upstanding structure; and a plurality of hinge pins;

wherein the first conveyor belt modules and the second conveyor belt modules are interconnected end to end into a series of rows of conveyor belt modules with the hinge eyes of adjacent rows interleaved and connected by the hinge pins.

50. A conveyor belt module comprising:

a module body made of a hard plastic material and having hinge eyes along opposite ends of the module body and an intermediate base portion between the opposite ends of the module body, wherein the base portion includes a textured surface;

upstanding structure made of a resilient material thermally bonded to the textured surface of the base portion of the module body; and wherein the base portion of the module body is textured in the form of parallel lateral ridges extending across the base portion between the first and second ends.

51. A conveyor belt module as in claim 50 wherein the upstanding structure forms a flight.

52. A conveyor belt module as in claim 51 wherein the upstanding structure forms a bore therethrough.

53. A modular conveyor belt comprising:

a plurality of first conveyor belt modules as in claim 50;

a plurality of second structurally similar conveyor belt modules interconnectable with the first conveyor belt modules, but lacking the upstanding structure; and a plurality of hinge pins;

wherein the first conveyor belt modules and the second conveyor belt modules are interconnected end to end into a series of rows of conveyor belt modules with the hinge eyes of adjacent rows interleaved and connected by the hinge pins.

54. A conveyor belt module as in claim 13 further comprising a top edge made of a hard plastic material thermally bonded to an upper edge of the resilient material.

* * * * *